United States Patent
Cohen et al.

(10) Patent No.: US 9,659,206 B2
(45) Date of Patent: May 23, 2017

(54) STATION FOR ACQUIRING BIOMETRIC AND BIOGRAPHIC DATA

(71) Applicant: THALES, Paris (FR)

(72) Inventors: Marc Cohen, Velizy (FR); Frederic Russel, Velizy (FR); Jerome Le Grouyer, Velizy (FR); Nicolas Foucal, Velizy (FR); Sandra Marti, Velizy (FR); Stephane Belardi, Velizy (FR); Severine Brunold, Velizy (FR); Julien Weber, Velizy (FR)

(73) Assignee: THALES, Neuilly sur Seine (FR)

(*) Notice: Subject to any disclaimer, the term of this patent is extended or adjusted under 35 U.S.C. 154(b) by 0 days.

(21) Appl. No.: 14/379,965

(22) PCT Filed: Feb. 22, 2013

(86) PCT No.: PCT/EP2013/053598
§ 371 (c)(1),
(2) Date: Aug. 20, 2014

(87) PCT Pub. No.: WO2013/124437
PCT Pub. Date: Aug. 29, 2013

(65) Prior Publication Data
US 2015/0036898 A1 Feb. 5, 2015

(30) Foreign Application Priority Data
Feb. 23, 2012 (FR) ...................................... 1200529

(51) Int. Cl.
G06K 9/00 (2006.01)
G03B 17/53 (2006.01)
(Continued)

(52) U.S. Cl.
CPC ......... *G06K 9/00013* (2013.01); *G03B 15/05* (2013.01); *G03B 15/06* (2013.01);
(Continued)

(58) Field of Classification Search
None
See application file for complete search history.

(56) References Cited

U.S. PATENT DOCUMENTS 4,688,105 A * 8/1987 Bloch ................. G07F 17/0042
360/137
2009/0080708 A1 3/2009 Mellen et al.
(Continued)

FOREIGN PATENT DOCUMENTS

DE 10 2006 046 395 A1 4/2008
GB WO 9426057 * 11/1994 ............. G03B 17/53
(Continued)

*Primary Examiner* — Fred Hu
(74) *Attorney, Agent, or Firm* — Baker & Hostetler LLP

(57) ABSTRACT

A system allowing the acquisition of biometric and biographical data of an individual includes a station into which at least one of the following elements are integrated: a sensor of biometric prints, a camera for taking a picture of said individual, a feedback screen and a gantry including lighting means adapted for ensuring lighting complying with given conditions of acquisition of the biometric data. The lighting means include a curved metallic reflector fixed to the rear and to the apex of the framework of a first upper light tube placed substantially horizontally, furnished with a protection which is lowered and oriented toward said reflector, and a second light tube disposed substantially horizontally in the lower part of the framework, where the power $P_2$ of the second lighting tube being lower than that the power $P_1$ of the first tube.

15 Claims, 9 Drawing Sheets

(51) Int. Cl.
*G03B 15/05* (2006.01)
*G06K 9/03* (2006.01)
*H04N 5/232* (2006.01)
*H04N 5/235* (2006.01)
*G03B 15/06* (2006.01)

(52) U.S. Cl.
CPC ......... *G03B 17/53* (2013.01); *G06K 9/00912* (2013.01); *G06K 9/036* (2013.01); *H04N 5/2354* (2013.01); *H04N 5/23222* (2013.01); *G03B 2215/0525* (2013.01); *G03B 2215/0571* (2013.01); *G03B 2215/0582* (2013.01)

(56) References Cited

U.S. PATENT DOCUMENTS

| | | | |
|---|---|---|---|
| 2010/0208129 A1* | 8/2010 | Rindfuss | G06K 9/2018 348/370 |
| 2010/0308108 A1 | 12/2010 | Choi et al. | |
| 2012/0293642 A1* | 11/2012 | Berini | G06F 21/32 348/77 |

FOREIGN PATENT DOCUMENTS

| | | |
|---|---|---|
| KR | 20080033617 A | 4/2008 |
| WO | 2010099356 A1 | 9/2010 |

* cited by examiner

STATION FOR ACQUIRING BIOMETRIC AND BIOGRAPHIC DATA

CROSS-REFERENCE TO RELATED APPLICATIONS

This application is a National Stage of International Patent Application PCT/EP2013/053598, filed on Feb. 22, 2013, which claims priority to foreign French Patent Application No. FR 1200529, filed on Feb. 23, 2012, the disclosures of which are incorporated by reference in their entirety.

FIELD OF THE INVENTION

The subject relates to a station or device making it possible to acquire biometric and biographical data, for example personal data, notably to establish an official identity credential.

The invention is used, for example to establish a biometric passport and/or to check the information of a passport.

BACKGROUND

The objective of most States is to deploy solutions for acquiring biometric data on the scale of their country. These solutions must allow the inputting of data of civil status type, the acquisition of fingerprints and the taking of photos.

The problematic issue presented by these stations is, notably, of being easy to install, of being effective in terms of number of people enrolled per hour, of being ergonomic in relation to the citizen who comes to enroll, of performing the acquisition of good quality prints, of taking photos in accordance with the recommendations required in this field.

The solutions proposed and known to the Applicant require several acquisitions of the same prints so as to have a sufficient level of quality and several acquisitions of photos to obtain a photo in accordance with the aforementioned recommendations.

Currently proposed stations give no information to the citizen who is enrolling, the operator guides the citizen verbally. This may lead to erroneous movements of the citizen. The latter may indeed not understand how to place their fingers on the print sensor, shift their fingers during capture, or withdraw their fingers before the end of capture, thereby leading to erroneous information acquisitions or to time loss. In terms of acquisition of the photo, after the photo is taken, the citizen asking to see his photo, moves so as to look at the picture shot on the operator's screen. If he does not agree to the picture shot, he will return to his seat for another shot. In his movement, he may not reposition himself exactly in the same position, in this case the previous settings are no longer relevant, and this may lead to a large number of photo shots.

In the subsequent description the word "Applicant" is used to designate a person who desires to obtain an identity document, and the word "operator", the person charged with the establishing of this credential.

SUMMARY OF THE INVENTION

One of the objectives of the present patent application is to offer a system allowing fast acquisition of biometric data, and of photos so as to establish an identity card or a biometric passport while complying with conditions required by a State.

The invention relates to a system allowing the acquisition of biometric and biographical data of an individual, characterized in that it comprises in combination at least the following elements:

A station into which at least one of the following elements are integrated: a sensor of biometric prints, a camera for taking a picture of said individual, a feedback screen, A gantry comprising lighting means adapted for ensuring lighting complying with given conditions of acquisition of the biometric data, The lighting means are composed of a curved metallic reflector fixed to the rear and to the apex of the gantry, of a first upper light tube placed substantially horizontally, furnished with a protection which is lowered and oriented toward said reflector, a second light tube disposed substantially horizontally in the lower part of the framework, the power $P_2$ of the second lighting tube is lower than that $P_1$ of the first tube, Said station being linked by a connection setup to a microcomputer.

The lighting means are, for example, adapted for guaranteeing an acquisition of photos in accordance with the quality constraints relating to the standard ICAO 9303 and ISO 19794-5.

The system can comprise means of secure transmission adapted for dispatching the biographical and biometric data, acquired in anonymous ways and decorrelated, between the microcomputer and a network N.

According to a variant embodiment, the microcomputer comprises a processor adapted for executing at least the following custom modules:

a module for acquiring the biographical data of an applicant, a module for acquiring biometric data of an applicant, of a photograph, of prints, the module for acquiring a photograph being adapted for displaying a photograph on the feedback screen, and for prompting the individual to frame his face, to position himself with respect to the camera, and for warning the individual that the acquisition of his photograph is in progress, and then for verifying the quality of the photograph and for validating the photograph in the case where the quality of the photograph is acceptable, a module for acquiring and checking the quality of the taking of prints, adapted for checking the relationship between a print performed and a finger, for checking in real time and continuously the quality of the images acquired for each of the fingers and for selecting in real time the best image obtained for a finger.

The system can comprise a means adapted for checking the quality of the taking of prints, said means being adapted for displaying on the feedback screen a color scale as a function of the quality of the taking of prints.

The camera is integrated into the framework, with externally sited capabilities for adjusting picture taking, accessible from outside.

The framework comprises, for example, a horizontal part and a vertical part and

The print sensor is integrated into the horizontal part of the framework, in proximity to the edge of the framework, The camera, is integrated into the vertical part of the framework, at average height of the eyes of an individual in a seated position, The feedback screen is integrated into the vertical part of the framework, facing the individual, below the camera and above the print taking sensor.

The system according to the invention is notably used to collect all the biometric and biographical data in accordance with the establishment of secure documents, such as an identity card, a passport, a driver's license.

BRIEF DESCRIPTION OF THE DRAWINGS

Other characteristics and advantages of the device according to the invention will be more apparent on reading the description which follows of an exemplary embodiment given by way of wholly nonlimiting illustration, together with the figures which represent.

DETAILED DESCRIPTION

Figure 1A:
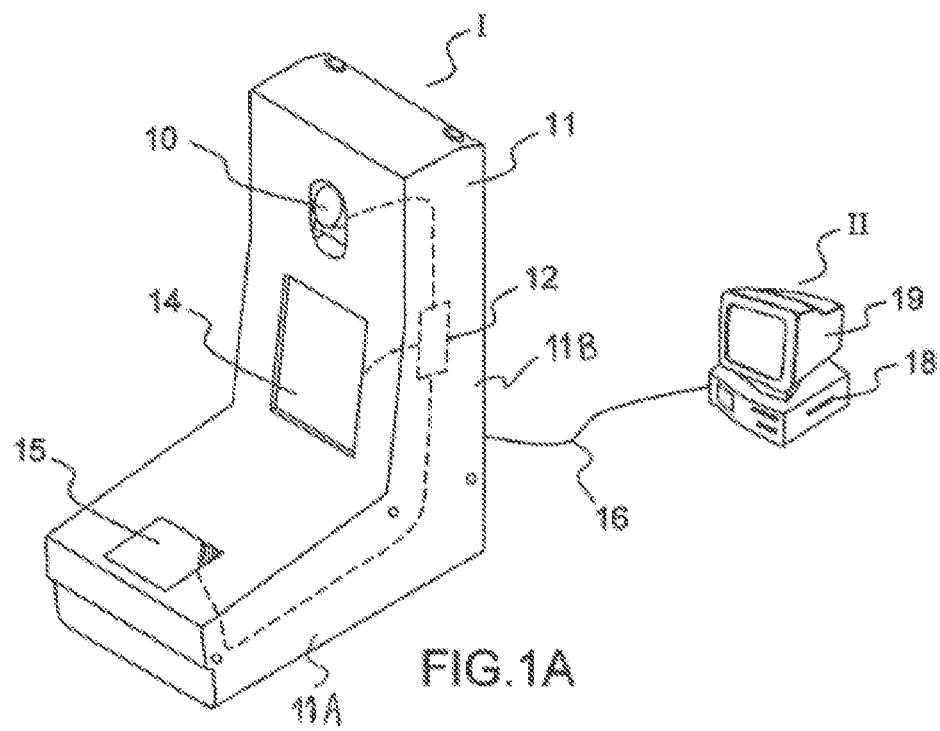
FIG. 1A and FIG. 1B, a diagram representing the station for taking prints and a photograph, FIG. 1C an exemplary architecture, FIG. 2A, a diagram indicating the most suitable lighting conditions for taking a photograph, FIG. 2B, a detail of the lighting diagram, FIG. 3, a diagram comprising the main steps implemented in the invention, FIG. 4, a representation of states, FIG. 5, a representation of a data acquisition screen, FIG. 6, a diagram of the inputting of the data, FIG. 7, an example of photos shot display screen, FIG. 8, a representation of a display screen during the acquisition of the prints, FIG. 9, an operator screen during the acquisition of the prints, and FIG. 10, a screen during the printing of an official receipt.
Figure 1B:
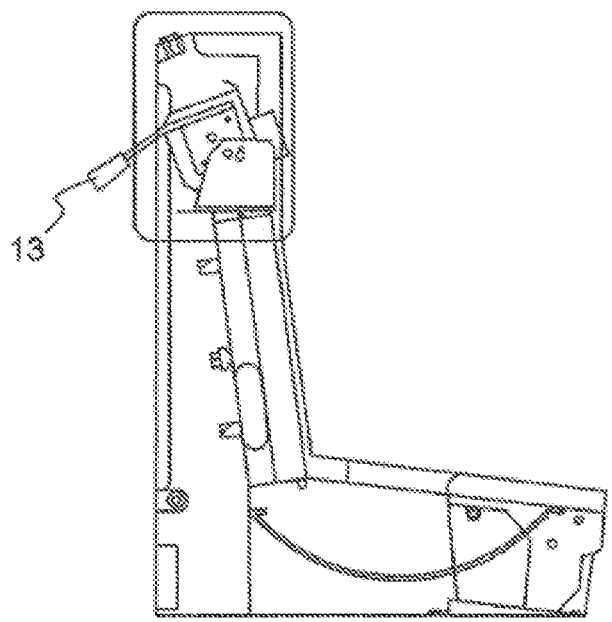

FIG. 1A represents an exemplary embodiment of a station 1 for acquiring the data making it possible to acquire biometric and biographical data of an individual. The station is, for example, composed of a framework 11 comprising a horizontal part 11A and a vertical part 11B. The system is for example composed of a "data acquisition" first part I composed of a means for taking images such as a camera 10 secured to the framework 11 comprising connection setup means 12 making it possible to link the various elements (print sensor, feedback screen, camera) to the data processing second part II. The camera is linked, via the connection setup 12 and a cable 16, with a microcomputer 19, such as an office desktop PC with its man machine interface (screen, keyboard). It comprises, for example, a PC equipped with a processor allowing execution of the various pieces of software implemented in the present invention. The camera 10 is integrated into the framework. The axis of the camera is, for example, linked to a manipulation means 13 or lever which allows an operator to find the best position for taking image shots without requiring the subject or individual to shift. The station comprises a feedback screen 14 adapted for allowing an individual to ascertain the steps that he must follow during the acquisition of the necessary information for establishing his identity. The feedback screen 14 is situated, for example, in the middle of the vertical part of the station and below the camera. The station comprises a print taking sensor 15.

For example, simple animations on the feedback screen make it possible to show the position of the hands to be complied with, the placement of the person's face in a given reference frame, the image resulting from the acquisition of the data or the image taken by the camera, the image resulting from the acquisition of the prints when the user rests his fingers on the print taking sensor 15 positioned on the horizontal part 11A of the framework 11, to show the user the measurement of the quality associated with the acquisition of the prints, and in fact guide the user to find the appropriate position, the correct pressure with which he must apply his fingers so as to obtain the quality at the print taking level. This feedback screen also makes it possible to indicate to the user the end of data acquisition. The camera could also be a digital photographic apparatus.

The arrangement of these various elements, at least the camera 10, the screen 14, the print sensor 15 is, for example, adapted for allowing the individual to directly read the information and setpoints displayed in real time on the feedback screen during the phase of capture of the individual's prints, as well as during the acquisition of the individual's photo. Accordingly the elements are for example disposed in the following way:

The print sensor 15 is integrated into the horizontal part 11A of the framework 11, in proximity to the edge of the framework, so as to favor, for example, access from a seated position;

The image taking device, or camera 10, is integrated into the vertical part 11B of the framework 11, at average height of the eyes of an individual in a seated position, for example;

The feedback screen 14 is integrated into the vertical part 11B of the framework 11, facing the individual, below the image taking device and above the print taking sensor 15.

Figure 1C:
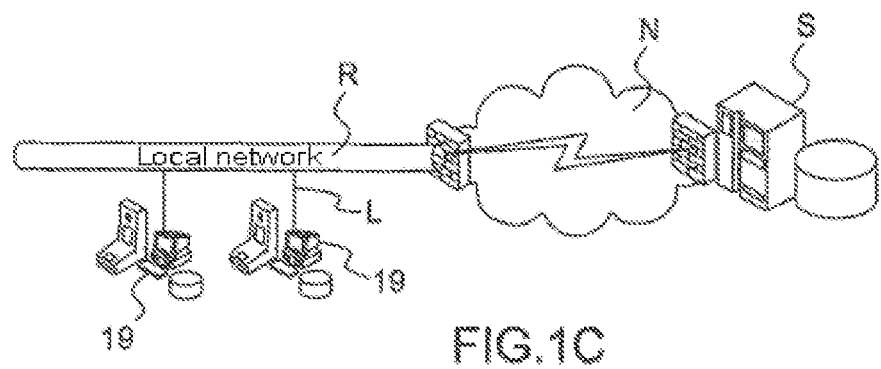

The PC comprises a work memory or random-access memory having a sufficient capacity for the processing of the sensed data, these data not being recorded under normal operation of the system. That is to say, in case of a power cut, the data are not saved. The PC 19 is equipped with a card reader 18, making it possible to verify the authentication of the operator. The processed data are thereafter transmitted by secure communication means to a processing site. The algorithms for secure transmission of the data are algorithms allowing their transmission in complete security, that is to say an outside observer may not reconstruct the content of the transmitted data. FIG. 1C depicts diagrammatically an exemplary architecture in which several data acquisition stations according to the invention are linked to a local network R, by links L, the local network is linked up with a network N which will direct the data to a national system N. The means of secure transmission are adapted for dispatching the biographical and biometric data, acquired in an anonymous way and decorrelated, between the micro-computer 19 and the network N according to techniques known to the person skilled in the art.

The PC is, for example, linked to a flatbed scanner, a laser printer, a multifunction keyboard integrating contact chip card reader and MRZ reader, a contact and RFID contactless chip reader, a printer for the passport once the biometric and bibliographic data have been acquired and validated by the operator.

The sensor for detecting prints 15 is for example chosen to ensure both the enrollment and the verification of the prints.

The function of the feedback screen 14 is notably to guide the Applicant requesting an identity credential. It makes it possible to display information while capturing the prints and the photo, to help the Applicant to position himself properly facing the camera or to place his fingers properly on the sensor. It also makes it possible to display the civil status information input for verification by the Applicant. The feedback screen makes it possible to associate the Applicant with the acquisition process interactively. It offers the Applicant, if appropriate, the possibility of requesting a new photo shot to find the position, the angle, the lighting that will show him to best advantage.

Figure 2A:
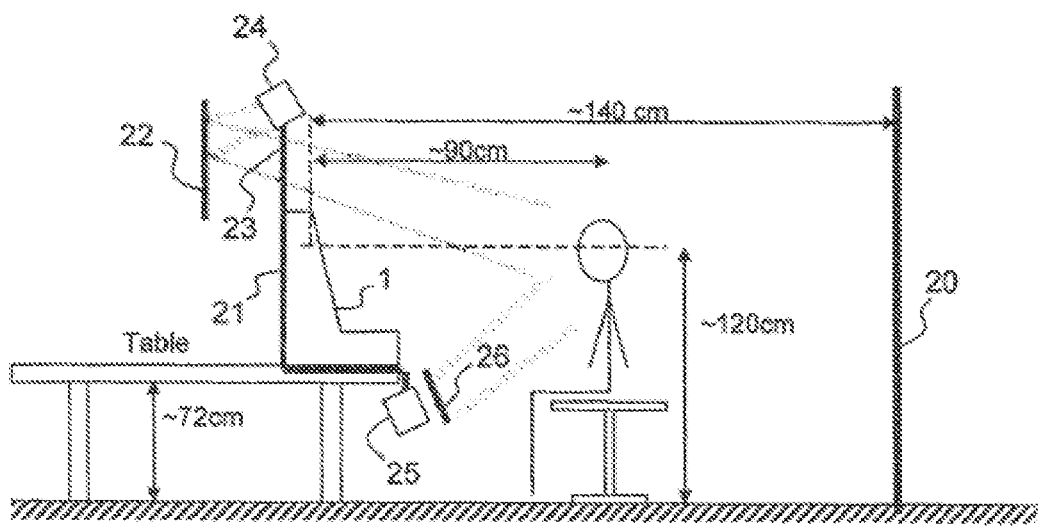
Figure 2B:
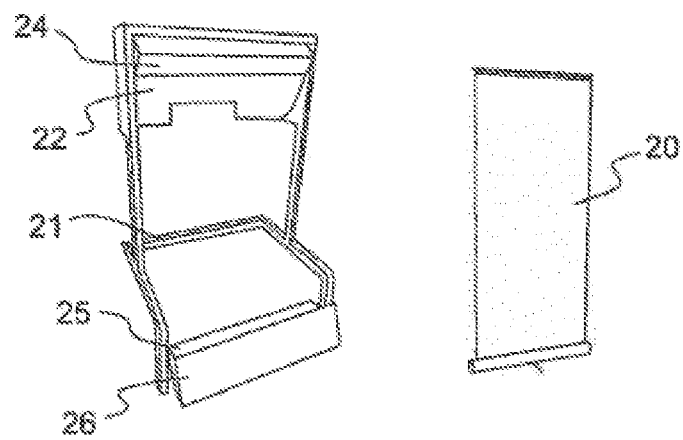

FIGS. 2A and 2B diagrammatically depict an exemplary lighting system having the objective of obtaining a quality of image obtained by the camera, more particularly a quality at the brightness level. This quality can notably be obtained by arranging the data acquisition console, with respect to a lighting system and a background 20.

The lighting system according to the invention comprises, for example, a gantry 21 on which the data acquisition console 1 is disposed. A lighting system based on reflection and diffusion, composed of a curved metallic reflector 22, is fixed to the rear and to the apex 23 of the gantry. A first upper light tube 24 placed substantially horizontally furnished with an entirely transparent protection is lowered and oriented toward the reflector. A second light tube 25 is disposed substantially horizontally in the lower part of the framework. The luminous power $P_2$ of the second lighting tube is lower than that $P_1$ of the first tube. The second tube is for example equipped with a diffusion cowl 26. The two tubes are positioned for example horizontally, to avoid reflections in users' spectacles for example. The two tubes make it possible notably to illuminate the face under the chin and above the forehead of the user, thus making it possible to avoid the shadows created by the use of a single source. The total lighting power is notably chosen so as to cancel any interference due to the ambient lighting. The lighting means are notably adapted so as to guarantee an acquisition of photos in accordance with the quality constraints relating to the standard regarding travel documents ICAO 9303 and ISO 19794-5, such as the absence of shadow and of spots or "hot spots" on the face, the natural look of the colors, etc.

An exemplary functional description of the system according to the invention is, for example, as follows.

The software loaded at the level of the microprocessor and executed by the system according to the invention is adapted for loading and executing the custom modules listed hereinafter:

_Reception of the application, this module relates to the acquisition of all the data constituting the passport application.

_Biometric enrollment, in the case where the acquisition of the biometric data (photo and prints) is performed on a dedicated post, a module performing only these operations must be available.

_Validation, validation is the act which involves the agent that will send out the Pa0sport application.

_Instruction of the application, is performed at regional council level, instruction allows the verification of all the documents before approving or refusing the production of the credential.

_Handover of the credential, once produced and forwarded to the issuing office, the credential is handed over to the Applicant.

_Issuing of a temporary passport. This is performed by the regional council, this act requires the formatting of the Applicant client's data for printing _Management of events, declaration of loss, of theft, cancellation of an application or of a credential _Consultations, the users of the system must be afforded access to all or part of the information relating to them.

The reception of the passport application constitutes the main module. It relates to the whole of the application process, from initialization up to the moment when the folder is complete (all the documents have been acquired). All the types of applications can be managed by this module. It comprises the acquisition of the civil status, of the photo, of the prints, of the signature, of the supporting documentation. It also makes it possible to read the chip of the passport during a renewal so as to speed up the capture of the application and also to authenticate the bearer by a print comparison. The software of the reception device is a particular case of the reception of the application where only the acquisition of the biometric data of the citizen client is performed: photo, and fingerprints.

Description of the Operation of the System

Before starting the computer, the operator will insert his agent identification card into the dedicated reader 16 linked to the computer 19. The software will initialize itself and then a window for inputting the PIN code of the agent card appears. The operator will then input the PIN code associated with his card and validate it with the help of the OK button of the window.

The software of the computer or PC comprises several modules and functionalities.

Figure 3:
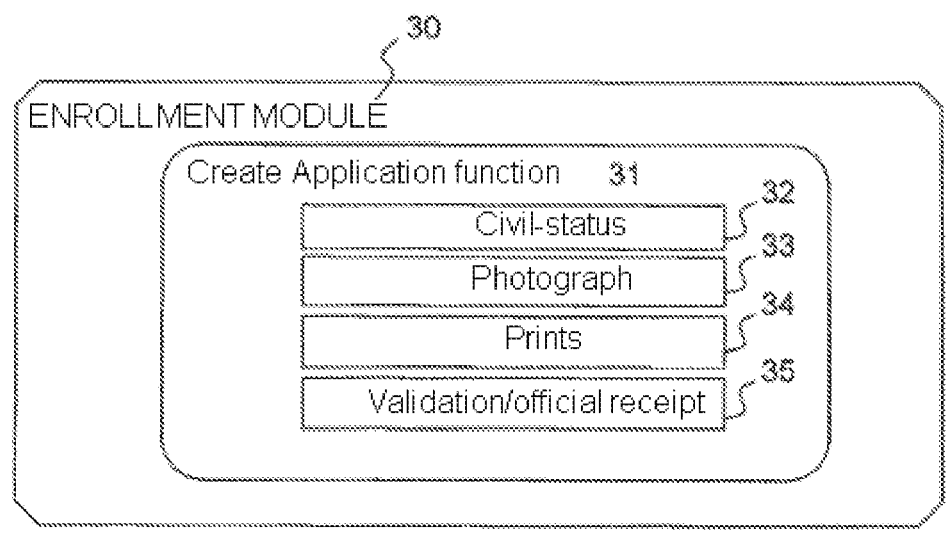

An enrollment module (FIG. 3) possesses a functionality which is create identity document application. FIG. 3 represents the functionalities of this module 30. The Create Application function 31 will call upon numerous screens. Each of these screens is dedicated to the acquisition of the various types of data, biometric or biographical. The default sequence in which the screens are strung together is managed by configuration of the system. The "Create Application" function corresponds to a "Capture the data" function, i.e. a capture of data on the basis of an application created beforehand. In the context of the example given to illustrate the present invention, the screen sequences are for example: Civil-status 32, photograph 33, prints 34, finalization 35.

Figure 4:

The evolution of the application when establishing an identity paper is tracked by virtue of its state shown diagrammatically for example in FIG. 4. There are 2 application states in the system, represented in FIG. 4: "In progress", the application is created, and "Finalized", no modification of the data acquired is then possible. Before the "In progress" state, no information is saved in the system.

Figure 5:
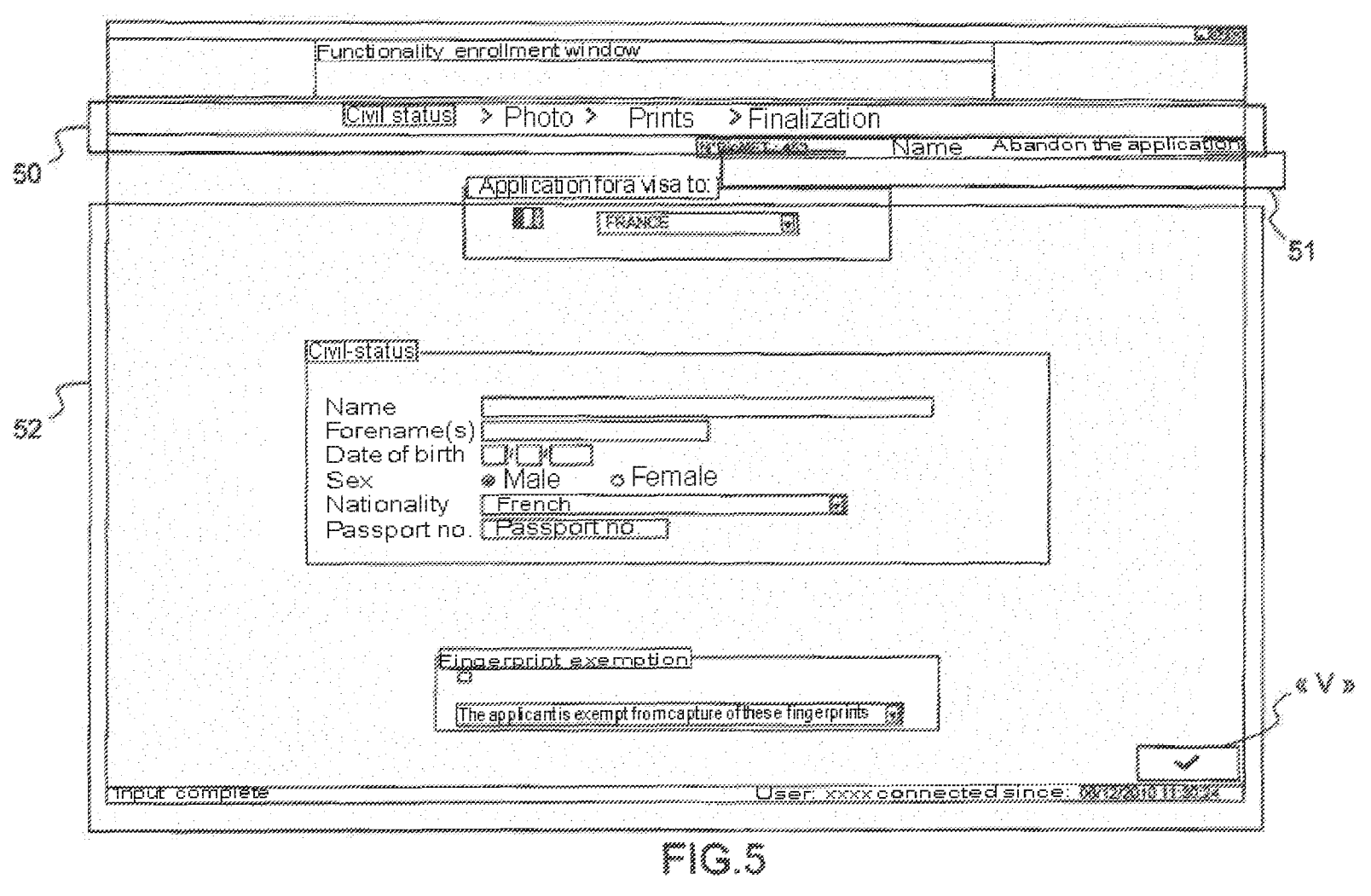

FIG. 5 depicts diagrammatically a representation of the data acquisition screen. This screen is composed of several parts; the toolbar 50, the acquisition information bar 51 under the acquisition bar, and the capture zone 52 at the center. The acquisition bar remains displayed as long as the data acquisition process has not terminated.

It shows the various acquisition steps configured for the application, and the order of acquisition: acquisition is always performed from left to right in a linear manner.

The step of acquisition in progress is made to stand out from the others through an orange colored highlighting of the tab.

The work bar acquisition steps can receive a particular marking:

"V" signifies that data have been correctly captured.

The acquisition information bar remains displayed as long as the data acquisition process has not terminated.

It displays basic information about the application to create identity documents:
  the No. of the application,
  the name of the applicant.

Moreover it affords access to the abandon application function, via the "Abandon application" button.

The input civil status function will authorize the operator to capture the applicant's bibliographic data.

From the main screen, the operator will select [enrollment] [input complete], and will then click on the corresponding button in the toolbar.

Figure 6:
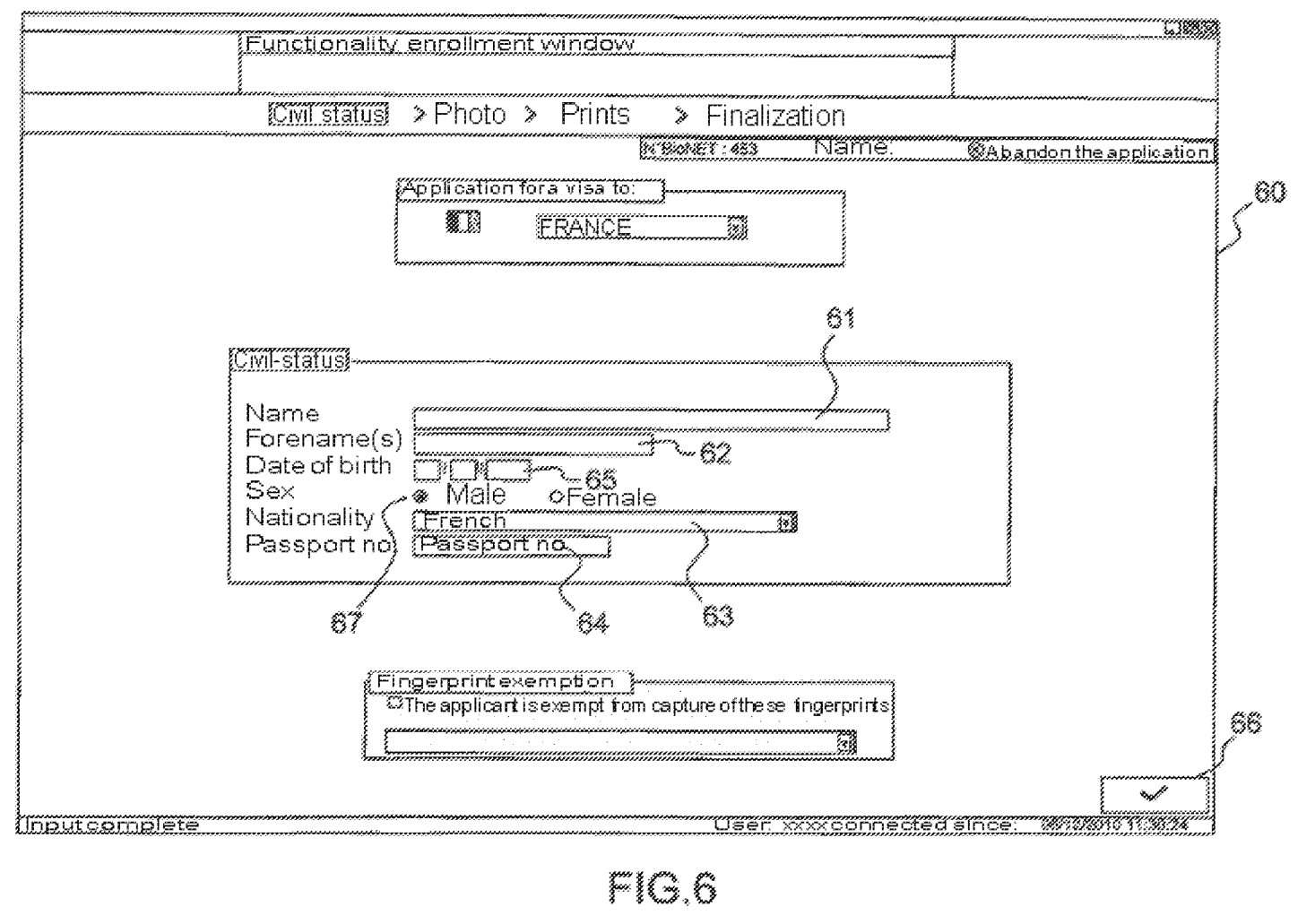

Once the operator has launched the function, the civil-status data input screen 60 appears (FIG. 6).

Once this screen is loaded, the operator can start inputting the Applicant's civil-status. The inputting of the civil-status can be performed:

either by reading the MRZ band of the passport,
or manually by the operator.

After reading the civil-status with an MRZ reader, it is not possible to modify the data read, but it is possible to complete some of them. In an MRZ band, it may happen that the name or the forename are truncated. In this case, the operator has the possibility of completing these fields, such as they appear on the passport.

Fields 61, 62 "Name and Forename(s)" have a fixed length. This signifies that the number of characters is limited. The Name field 61 is limited to 50 characters. The Forename(s) field 62 is limited to 25 characters.

If the MRZ reader is unavailable, the operator must input the applicant's civil-status data manually.

The data to be inputted are for example:
  name,
  forename(s),
  date of birth,
  sex,
  nationality,
  passport No.

A possibility of step-by-step procedure is for example as follows:

Name; Enter the name as it appears in the corresponding passport field. The name is automatically in uppercase.

Forename(s): Enter the forename(s) in uppercase as it (they) appears (appear) in the corresponding passport field. The forename is automatically in uppercase.

Date of birth 65; Enter the field as it appears in the corresponding passport field. Enter the day of birth in the "DD" space, the month of birth in the "MM" space and the year of birth in the "YYYY" space.

The date of birth may be incomplete. It is possible to re-enter:
  a complete date (day, month and year, all known),
  a date whose day is unknown,
  a date whose day and month are unknown.

Select 67 "male" or "female" according to the value inscribed on the passport. The possible values are:
  F for "female",
  M for "male".

Enter the nationality as it appears in the corresponding passport field.

There are, for example, two ways of choosing the nationality 63:

The operator selects the nationality via the pop-up list

The operator begins to type the first letters of the nationality, and then selects the nationality with the help of the up/down arrows, and finally validates the selection by pressing the Enter key.

Enter the number of the passport, 64, as it appears in the corresponding passport field.

Exemption of the Fingerprints

The inputting of the applicant's civil-status data makes provision to indicate whether the applicant is exempted from the acquisition of his fingerprints, or not 65.

Validation of the Civil-Status Data

Once the civil-status data have been input, the operator must validate the form in order to pass to the next acquisition.

To validate the form, the operator must click on the validate button "V", 66, indicated by a green arrow on a blue background for example. This action validates the data input (manually or automatically), and saves them in memory. Before passing to the next acquisition, the marker "V" is displayed in front of the name of the civil-status inputting step.

While saving, a small window appears briefly in the bottom right of the application with the message "save data".

Case of Error in the Validation of the Civil-Status Data

The validation of the civil-status verifies the data input. The verifications performed are specific to each field.

If a field is missing or invalid, this will be indicated, for example, by a white cross icon on a flashing red background.

An unavailability of the MRZ band reader will be manifested by an error message (sometimes flashing) in the bottom lower corner of the application.

In the case where the error message "MRZ reader not connected" is displayed, the operator will verify the following points:
  1. Verify that the reader is powered up (its power plug is properly connected to the mains)
  2. Verify that the reader is switched on (a light indicates that the apparatus is switched on)
  3. Verify that the reader is hooked up to the PC (the USB cable of the apparatus must be connected to the PC)

In the case where the error message "MRZ reader error" is displayed, the operator will verify the following points:
  1. Verify that the MRZ reader connected to the PC is that which is configured for the software application
  2. Quit the software application and verify the proper operation of the reader with the reader test application In the case where the error message "Initialization of MRZ reader failed" is displayed, the operator must verify the following points:
  1. Verify that the MRZ reader connected to the PC is that which is configured for the software application
  2. Quit the software application and verify the proper operation of the reader with the reader test application.

In the course of the acquisition of the applicant's civil-status data, various hardware related messages may be displayed.

Acquisition of the Photograph

This function allows the operator to acquire the applicant's photograph. The acquisition means implemented in this step help to capture a photograph of acceptable quality for an identity document, according to the recommendations of the ICAO standard ISO/IEC CD 19794-5 Part 5: Face Image Data.

The photo can be acquired, for example, in two different ways:
  "Live": the operator takes the applicant's photograph in real time, with a digital camera.
  Scan: the operator digitizes with a scanner the photograph provided by the applicant.

The photograph acquisition step makes it possible to pass from one to the other of the two modes, by virtue of a button situated above the PC's screen validation button. The icon of this button changes according to the mode of acquisition. In "Live" mode the icon is a scanner, and in "Scan" mode the icon is a photographic apparatus.

It is possible to indicate default manner of operation of the system. For example, the camera is initialized on loading the screen, and the live video is displayed automatically within the frame of the PC. If the camera is correctly initialized, the message "Camera initialized" is displayed in the bottom left of the screen of the software application. To take the photo with the help of a scanner, click on the button corresponds on the screen.

Taking the Photograph with a Camera

Once the photograph acquisition screen is displayed, the live video ready, the operator is ready to take the applicant's photograph.

The steps hereinafter describe an exemplary nominal case of an acquisition of the photograph.

Figure 7:
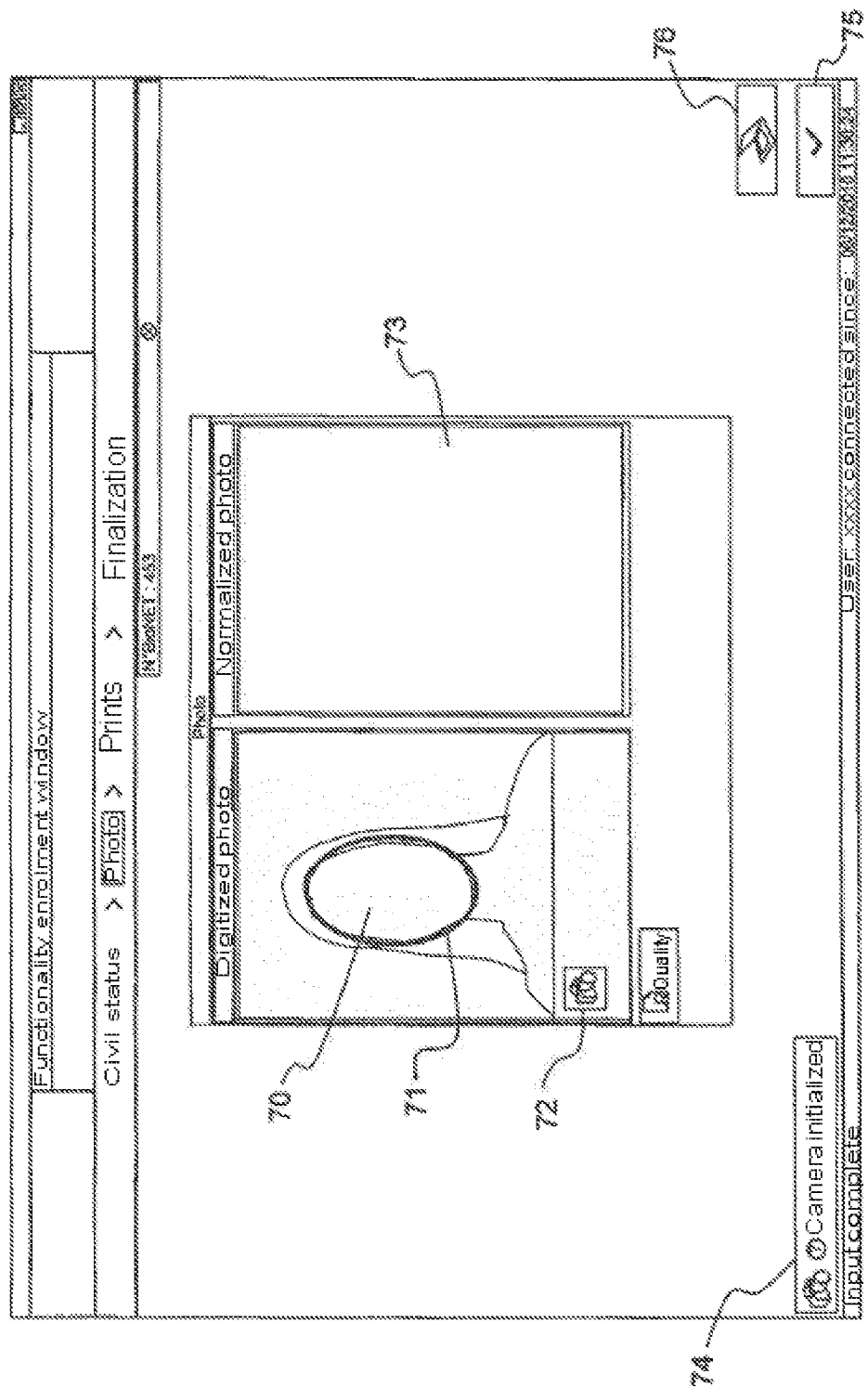

1) Frame the applicant so as to have his face 70 in an oval 71 for example as illustrated in FIG. 7, If necessary, the operator must prompt the applicant to center his face in the oval. Although the applicant is helped by the feedback screen, the operator nevertheless has a guide role in this acquisition phase.

The operator may, for example, prompt the applicant to bend down or straighten up if he is too low or too high, or to change the inclination of his face: the applicant must not look up, or down, or to the sides, and must not tilt his head forward, or backward, or to the sides.

2) When the centering is correct and the applicant satisfies the ICAO requirements, the operator warns the applicant that the capture is imminent, and then clicks on the corresponding button 72 on the screen of the PC.

The feedback screen warns the Applicant that acquisition is in progress. The feedback screen warns the Applicant that the photograph has been acquired and is being processed by the software application.

3) On the basis of the photograph acquired, the software application detects the applicant's eyes and face; once detected, the eyes appear in the form of red crosses. If the eyes are not detected correctly there will be a reframing of the eyes.

4) The software application then performs a reframing of the face according to the recommendations of the ICAO; the reframed image is displayed 73 within the frame [Image reframed] on the right at the level of the screen of the PC, and on the feedback screen.

5) The software application thereafter performs an automatic quality control check.

The automatic quality control check is performed on the reframed image.

The result of the automatic quality control check is indicated by a message at the bottom of the reframed image, and by a marker under the original image.

Marker "V" indicates result OK,

Marker ! indicates result KO.

The final operation consists in ruling as to the validity of the photograph. If the operator is in agreement with the automatic quality control check and deems the photograph to be acceptable (that is to say to comply with the recommendations of the ICAO), then he can save it by clicking on the "V" button 75 of the screen of the PC. This will save the reframed photograph and will pass to the next step of the collecting of the applicant's data. During the save, a small window appears briefly in the bottom right of the software application displaying the message "save data".

6) The final operation consists in ruling as to the validity of the photograph. If the operator is in agreement with the quality of the photograph, then he saves the photograph and passes to the next step of the collecting of the applicant's biometric data.

The software application is for example adapted for executing continuous measurement of a fixed zone of the image, and to adapt automatically and in real time the brightness of the photo image of the individual, thus guaranteeing the stability of the brightness of the images recorded independently of the physical characteristics of an individual and whatever the surrounding conditions, fluctuation in the daylight.

Manual Reposition of the Eyes

When the photograph has been taken, the processing system detects the subject's eyes and face. If the automatic detection of the eyes fails or is incorrect, the operator can reposition them manually, by modifying the coordinates of the red crosses symbolizing the location of the eyes.

To modify the eye on the left, he must click at the appropriate location with the left button of the mouse, To modify the eye on the right, he must click at the appropriate location with the right button of the mouse When the operator repositions an eye, the software application performs a zoom on the image. This zoom is displayed only when one of the buttons of the mouse is depressed. A short press on one of the buttons will display the zoom briefly, while a longer press will display a zoom for a longer duration.

The operator is alerted of a successful quality control check when the message "Quality control check OK" is displayed in blue under the reframed image.

The operator is alerted of a failed quality control check when the message "Quality control check KO" is displayed in red under the reframed image.

The indicators of the automatic control check result are displayed on the screen. An icon and the associated function can be consulted on the screen of the PC. Accordingly, at the level of the display of the PC, a "Quality" icon appears. The result of the quality test appears on the right of its label, for example. The result is signaled in green when it is considered to be good, that is to say above its acceptance threshold. This score is in red when it is considered bad, that is to say below its acceptance threshold.

When the quality control check is bad, the operator may be lead to retake a photograph.

Acquisition of the Photograph with a Scanner

According to a variant embodiment, the operator can launch the capture of the photograph through a scanner by clicking on a corresponding button 76 on the screen.

Digitizing the Photograph with the Scanner

When the screen for digitizing the photograph with a scanner is loaded without error (the message "Scanner initialized" has displayed itself) the operator is ready to digitize the applicant's photograph. The acquisition of the photograph with a scanner proceeds, for example, in 3 steps:

Insertion of the document into the scanner

Digitization of the document,

Reframing and quality control check of the photograph, these functions are the same as in the case of a photo shot with a camera.

Capture of Prints

Figure 8:
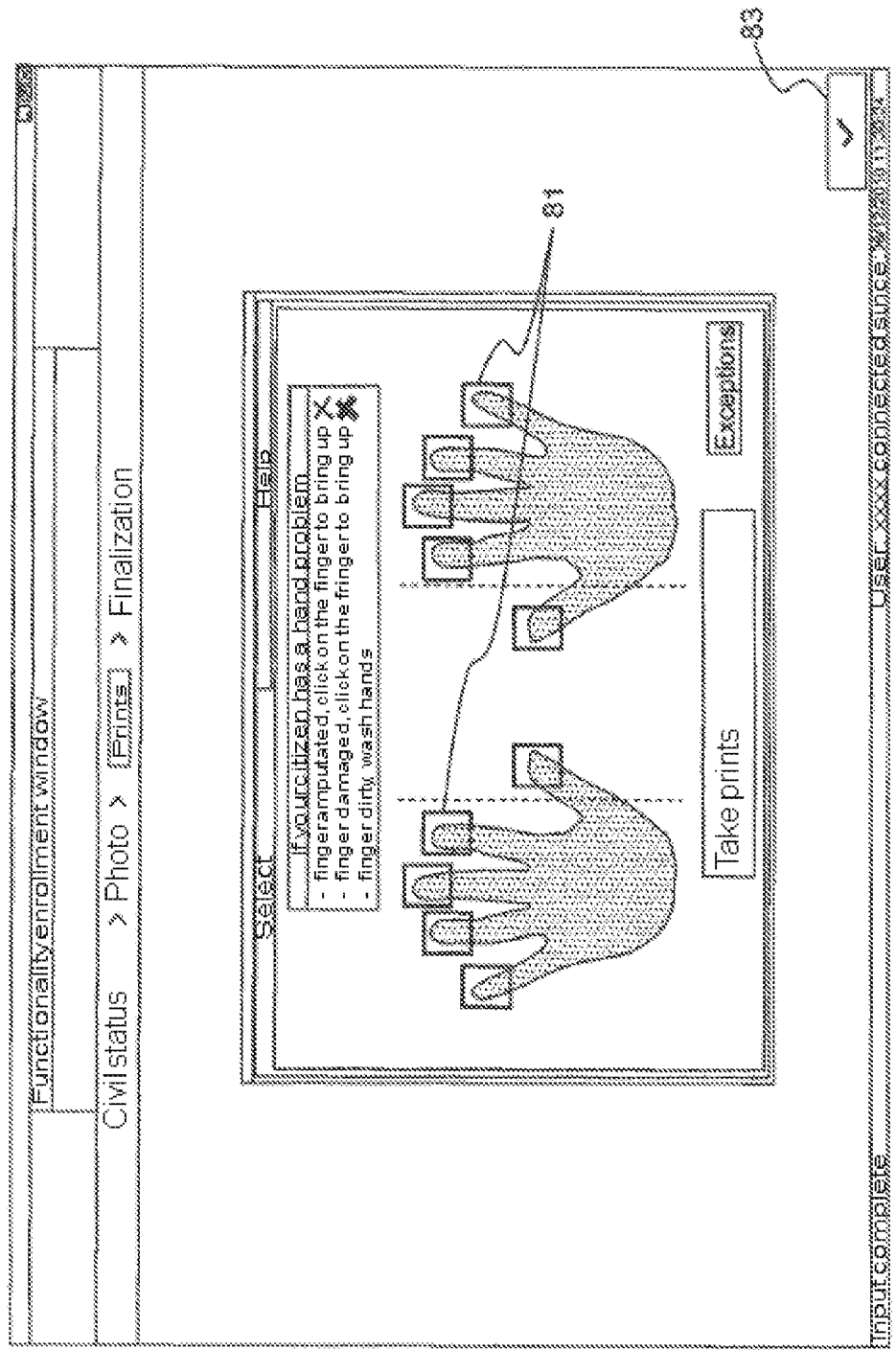

The "capture prints" function allows the operator to acquire the Applicant's fingerprints. The steps which follow will be described in conjunction with FIGS. 8, 9.

When the capture screen is displayed, the software application initializes the print sensor, this possibly taking several seconds (~10 s). When initialization has terminated, the initialization message box disappears. Two blue hands are displayed, which represent the subject's 2 hands laid flat. A frame 81, representing the fingerprint, is drawn at the tip of each finger.

The screen is separated into 3 parts numbered from 1 to 3, from right to left: this corresponds to the order of acquisition of the fingers:

the right hand $1^{st}$,
the left hand $2^{nd}$,
the two thumbs $3^{rd}$.

There is just a single fingerprint per finger. By default, the print frames are empty. All the empty print frames must be acquired.

Each print is checked specifically according to its nature (except for the pinkies). Here are a few non-exhaustive examples to illustrate this: _the index fingers are more important than the other fingers since they will be inserted into the chip of the passport, a check with a severer quality than for the other fingers will be performed, on average the surface of an index finger being of smaller area than that of a thumb, the surface acceptability threshold of an index finger will be lower than that of a thumb. Individual quality control of the fingers makes it possible to concentrate on the fingers that are difficult to acquire (prints over and underinked, prints arising from damaged and therefore unusable fingers, overly small prints). The aim is to not record such prints and to allow their reacquisition.

When the prints have been correctly captured, the operator clicks on the "V" button 83 to save the data. This will save the data and will pass to the next step of the workflow. During the save, a small window appears briefly "data saved".

If prints do not have the required sufficient quality, the operator can relaunch the taking of prints by clicking on the button [Relaunch the complete taking of prints];
The key points of the acquisition of the prints are:
  The capture of the fingerprints of the major part of the targeted population (when the fingerprints are available), with exception management and detections of fraud such as manual inversion or the presenting of the same finger twice;
  The checking of the quality of the images acquired and displaying of information (to the operator and to the applicant simultaneously) to obtain the best final quality;
  The automated sequence, with help and advice, to aid acquisition;
  The optimization of the acquisition time, without any compromise as regards quality.

The acquisition sequence, denoted "4-4-2", for acquiring the 10 prints is the one most commonly used, since it minimizes the time required while guaranteeing good image quality. It consists in the simultaneous acquisition of the four fingers of the right hand (with the exception of the thumb), of the four fingers of the left hand (with the exception of the thumb) and of the two thumbs. This sequence is illustrated with the presentation of the operator and applicant screens.

At any instant of the acquisition, the operator can choose to toggle into single-finger capture mode. This capability is particularly useful when: the fingers exhibit birth defects or defects following an accident in life (glued fingers, malformation of the fingers, etc.); there is poor quality of fingers (manual workers, surgery, burnt fingers, etc.).

This single-finger capture uses the same hardware and the same software and the same processing operations are applied.

Each image is processed so as to obtain, for each of the ten fingers, a compressed image of good quality.

The "constituents" which make up this device are of hardware, algorithmic and software kind. Algorithmic processing operations are necessary and applied to the multifinger images called slaps: a slap can therefore be composed of 1 to 4 fingers.

The ergonomics constituent represents the software ergonomics which addresses two subjects: the Man Machine Interface (MMI) of the operator application and the animations displayed on the feedback screen for the applicant. This allows the parties, namely the operator and the applicant, to optimize the presentation of the fingers by viewing the video image stream in real time.

The sensor constituent symbolizes the level of quality offered by the multifinger sensor. This level is ensured with the selection of a certified multifinger sensor guaranteeing image quality faithful to the fingerprints input with a view to an identity-related software application. The properties of this sensor make it possible to minimize the failure rate on enrollment.

The "slaps quality control check" constituent characterizes two algorithmic functionalities: the automatic capture of the multifinger images (slaps) and the viewing by the operator and the applicant of the level of quality of the presentation of the fingers.

The "automatic segmentation" constituent represents the algorithmic processing of automatic extraction of the images of prints on the basis of the slaps and then their labeling (Left thumb, Left index finger, etc.). Moreover, it checks the nature of the prints with respect to those expected: detection of the inversions of hands and checking of the number of fingers presented.

The "quality control check of prints and selection of the best images" constituent characterizes the quality control check performed at the level of each finger. This quality control check is complementary to that performed on the slaps. It also guarantees the selection of the best image of each finger from among those acquired in the video stream. It consists notably in allotting a quality score lying between 0 and 100 to a fingerprint image. The higher the quality of the image, that is to say, the more information useful to the data processing algorithms that is contained in the image, the greater the quality score.

The "image compression" constituent represents the processing intended to reduce the quantity of data manipulated without degrading the "useful" quality of the fingerprints.
Quality Control Check The software implemented by the invention integrates a quality control check for the slaps and for each finger. These real-time checks allow the selection of the best image of each finger, in a continuous manner during the acquisition time. Each image is selected independently of the others.
Positioning The position of the fingers must cover a maximum of the surface of the sensor. Red bars are displayed on the appropriate side in case of defect of positioning.
Number of Fingers This check verifies that the chosen sequence ("4-4-2" typically is complied with), i.e. that the number of fingers is that expected; it is adaptive as a function of the step in progress. In case of defect, a message is displayed to the operator.
Quality of the Information The signal-to-noise ratio of the slap must be optimal in the regions of interest. It is displayed by the color scale at the top of the screen, as well as on the color boxes surrounding each print.

Surface

The surface of the prints within the multifinger image must be of sufficient area. This piece of information is combined with the previous on the scale at the top of the screen, as well as on the color boxes surrounding each print. All these criteria are combined to calculate a unique quality-score for each finger, on a nonlinear scale from 0 to 100 (more accurate than required by the NIST standard). Each print is checked specifically to its nature. Different thresholds can be defined for each finger and for each criterion, as a function of requirements.

In parallel with the image compression, an encoding step is carried out so as to generate a reduced view of the characteristics of the fingerprints, that is to say a list of its minutiae called a template. The minutiae recorded are the ends of ridge lines and the bifurcations. Here again the format of this template is compliant and enacted by ISO standard 19794-2. As a supplement to these minutiae, if the ANTS agency so desires, it is possible to generate the ridge lines counting information (or simply "ridge count") which is optional in the standard.

The solution selects automatically and in real time the best image obtained for each finger, from among those acquired and processed in the video stream of the acquisition sequence.

At the end of the acquisition sequence, that is to say once the images of the ten fingers have been selected an appropriate module at the workstation level undertakes the verification of the uniqueness of each selected image. This makes it possible to check that the applicant has not presented the same finger several times. In the case of a positive result (at least 2 images arising from the same finger), the acquisition will be canceled and must be carried out again. The vigilance of the operator is then indispensable, he is informed thereof.

Segmentation

The segmentation is applied in real time on each multi-finger image:

Extraction of the first phalange of each finger within the image

Management of the declared cases of exception (damaged or absent fingers)

Once the previous steps have been carried out, the images of fingerprints obtained can represent more than 1 Mbyte of data (as a function of the number of fingers acquired). To aid their storage and their transfer through the network (to the identity management system which will utilize them), these images are compressed.

The ergonomics of the Man Machine Interfaces has been designed to aid the understanding of the processes, equally well at the operator level and at the applicant level. The software application utilizes two screens simultaneously, one turned toward the operator and the other toward the applicant. Each of them displays information specialized by type of party:

For the operators: a capture MMI with a minimum of actions to be carried out and an on-line accessible guide to good practices, For the applicants: a series of graphical animations and the viewing of the stream on the feedback screen.

This is of triple benefit:

Aid the acceptance of the applicant: he becomes party and witness to the capture of his prints;

Speed up the enrollment phases: presentation of the fingers becomes intuitive;

Aid operator—applicant communication: a certain amount of information is shared.

Figure 9:
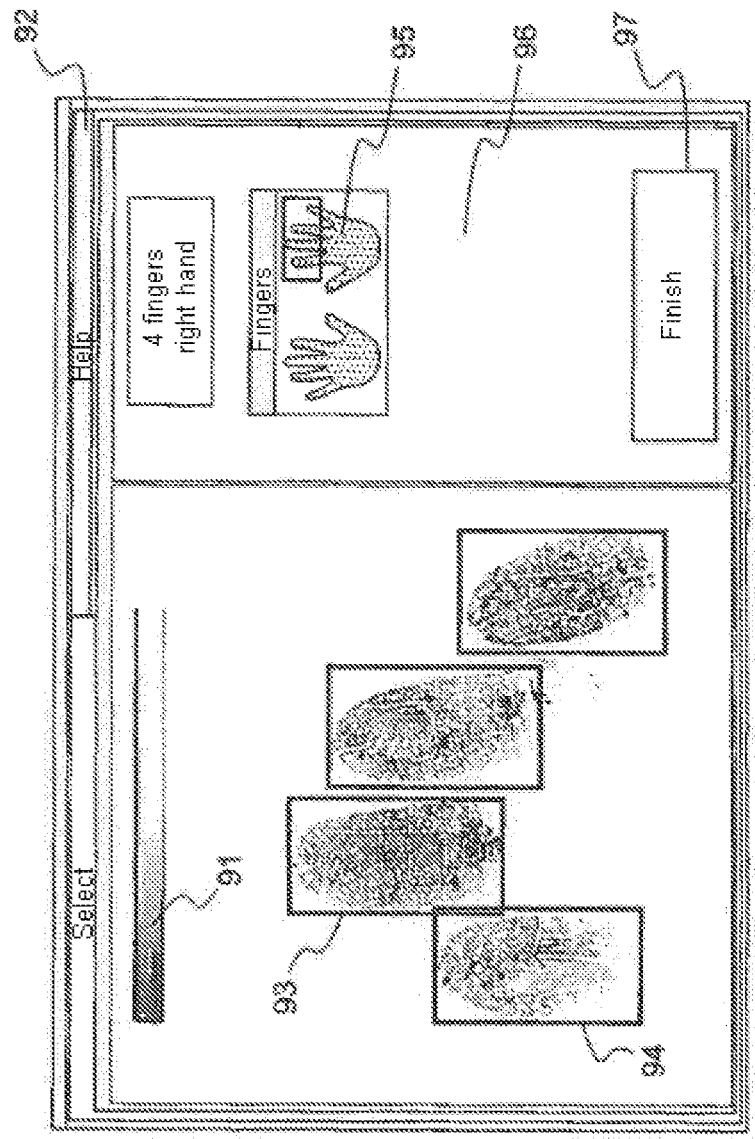

FIG. 9 depicts diagrammatically an exemplary screen showing them the print taking result.

For example, represented in FIG. 9 is a real-time indicator zone 91 of the quality of the image during an operation of taking prints, an on-line help tab 92, a real-time video stream zone 93, an indicator 94 of quality of the print, a step 95 of the sequence, an alert message zone 96 and a zone 97 for stopping the automatic sequence.

To illustrate the principle implemented in the method according to the invention, for example in the case where it is desired to check that a right hand is not presented on the reader in place of a left hand or that 4 fingers are presented instead of 3, the method can run the next steps:

A One firstly verifies whether or not a hand is presented on the sensor.

B A segmentation algorithm is thereafter applied to the complete image arising from the sensor: that is to say an algorithm will determine the position of n rectangles which enframe as closely as possible the first phalange of each of the n fingers.

According to a variant embodiment, it is possible to add a step of verifying the number of fingers presented on the sensor: is the number of fingers seen on the sensor identical to the number of valid fingers declared by the operator beforehand. It is also possible to add the possibility of not having a single orientation for the whole set of fingers if dealing with the acquisition of 2 thumbs. Thus during a conventional acquisition, all the fingers must be parallel to be accepted by the segmentation. But during a 2-thumb acquisition, this algorithm has the possibility of searching for 2 independent orientations for each of the 2 fingers: 2 non-parallel thumbs will thus be accepted by the segmentation algorithm.

C The likelihood of the result of this segmentation is thereafter checked, by implementing, for example, the next steps 1. Is the overall orientation of the hand consistent? Angle lying between −pi/4 and pi/4;

2. Are there not 2 fingers in the same rectangle? No presence of column of white pixels in the image contained in the rectangle;

3. Are the mutually relative dimensions of the rectangles consistent? Are the dimensions of the n rectangles similar to within 10%;

4. Are the dimensions of the rectangles consistent in an absolute manner? The dimensions of the n rectangles are compared with an interval of observed empirical dimensions. This authorized interval is different for the thumbs than for the other fingers.

5. Are the mutually relative positions of the rectangles in the overall image consistent? The orientations of these rectangles are similar with a margin of 10%, the ordinate of the top of rectangle i is similar to the other rectangles except for small finger, does the rectangle whose center is the lowest correspond properly to the small finger.

6. Are the missing fingers, that is to say, those which have been amputated or are impossible to acquire, indeed just where the operator declared them? If a missing finger is flanked by 2 fingers that are present, therefore absence of the index finger or of the middle finger, the distance between these 2 fingers that are present must be greater than 150% of the distance between 2 contiguous fingers that are present. If no missing fingers, the distance between rectangle i and rectangle i+1 must be similar for any i with a margin of 10%;

7. Detection of left hand/right hand inversion, calculation of the angle of the straight line passing through the 4 fingers by a linear regression. This angle must be included in an interval of angles which is obtained empirically for the left hand or right hand according to case;

8. Detection of fingers at the sensor edge, comparison of the most extreme abscissa of the set of rectangles. This abscissa must not be situated less than 32 pixels from the edge of the image;

If points 1 to 5 are in error, the result of the segmentation is rejected. No segmentation rectangle is displayed on the screen and the results of the segmentation will not be taken into account for this image.

If points 6 to 8 are in error, the problem is signaled on the operator screen and the subject screen, display of an appropriate message and in the "fingers at the edge" case, a red gradation is displayed on the edge concerned;

Running display on the operator screen and the subject screen of the quality of each finger and overall quality of the hand Use is made of the quality score on each of the fingers.

The overall quality score for the hand is, for example, determined by the formula:

Score_quality(hand)=min(score_quality(finger No.i))

In case a problem is detected during acquisition, a clear help is displayed on the operator screen and/or on the subject screen (example: display of a red gradation if a finger is presented at the sensor edge).

Automatic determination of the end of acquisition as a function of a speed of acquisition versus quality of acquisition compromise.

The adaptation of the acquisition time as a function of quality is, for example, carried out in the manner described hereinafter.

During the presentation of the hand on the sensor, a countdown is triggered: acquisition terminates automatically when this countdown reaches 0.

The value of this countdown is fixed at a predetermined value which is dependent on the state of aforementioned overall quality of the hand (excellent, good, average or mediocre). If this state evolves over time (passing from a mediocre to excellent state for example), the value of the countdown is fixed at the new corresponding predetermined value only if this implies a decrease of the countdown (therefore a shortening of the duration of acquisition).

The data are stored temporarily on the workstations of an operator in a secure manner, prohibiting their reading by an unauthorized third party or their modification. For example, the stored data are partially or totally encrypted to prevent the reading of the "useful" data item. However, the data are readable so as to be dispatched to the utilization site. Only the utilization site has the keys required to decrypt the transmitted data. The mechanism of dispatch and secure transmission verifies whether files have to be transmitted and dispatches them if appropriate. It transmits the encrypted data item.

An automatic process which is invisible to the operator regularly verifies whether folders have to be transferred to the central identity management system and whether an authorized network is available. In this case, the folders are automatically transferred and then, once received, deleted from the local storage. This custom mechanism allows the workstations to enroll the applicants independently of the availability of the network.

The disconnected mode is triggered when one of the following situations occurs:

Loss of connection of the network (network cable unplugged, faulty router, etc.);

Response delay exceeded by the system for managing the identity receiving the folders (central software application faulty, server shut down, etc.);

No network is available.

The operation of the fixed stations in disconnected mode depends on the connectivity thereof to the network Intermittent but non-definitive cutoffs of the network: in this situation, all the electronic folders constructed are stored locally while awaiting the restoral of the network. When the connection is restored, the data are automatically transmitted to the central system.

Network absent: the fixed station is configured to operate without the network. The transmission of the data can no longer be done on-line, but by means of hardware supports of CD-ROM or USB key type.

The mobile stations operate like the fixed stations, with an unavailable network: the data are stored on the mobile station as long as it is not connected to a network or as long as they have not been recorded on a removable medium. This mode of operation is beneficial when the mobile stations are used in non-connected zones intermittently referred to a site having the network.

The data are exchanged between the post and the system for managing the identity by Internet or by a private network. The security of the communication relies on the SSL protocol as is represented in FIG. 1C. This protocol makes it possible to ensure the confidentiality of the data exchanged at the level of the network layer in addition to the custom layer described previously. The establishment of the secure link is done by way of mutual authentication between an authentication certificate contained in the post (or in the operator's card) and the server's certificate.

Validation of the Application and Printing of the Official Receipt

Figure 10:
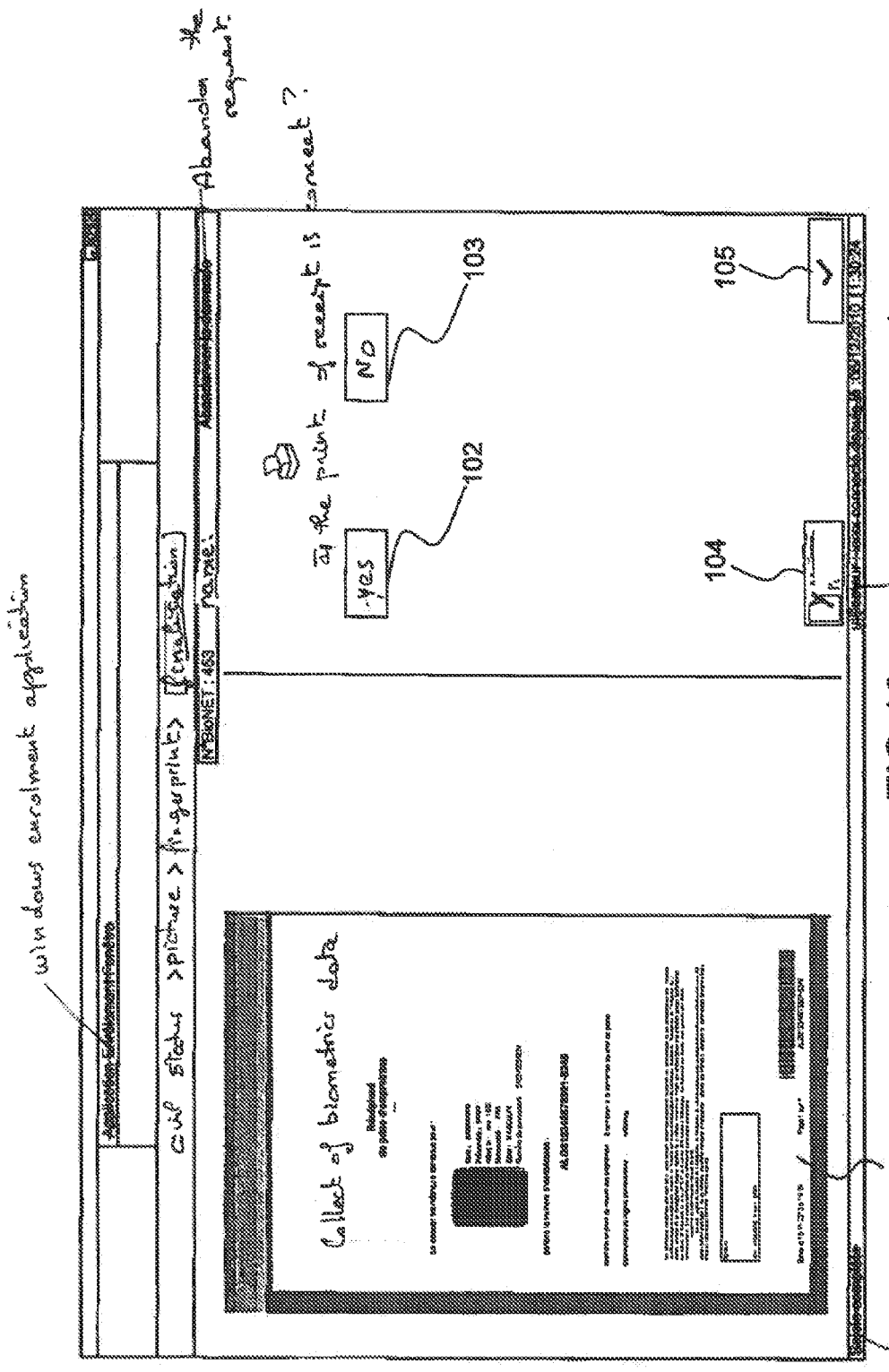

FIG. 10 depicts diagrammatically a screen on which an official receipt of taking of prints is displayed. 101. This function allows the operator:

1) To print the official receipt of the acquisition of the applicant's data, 102, or to refuse 103 in case of errors,
2) To validate the entirety of the acquisition of the applicant's data, 105,
3) To modify the applicant's civil-status, 104.

An application can be finalized only when all its data have been acquired.

When an application is finalized, there can no longer be any modifications of its data.

Upon loading this screen, the software generates the official receipt of the application, displayed on the left part. The available actions are displayed on the right part of the screen.

The validation of the passport application involves the next steps:

1) printing of the official receipt,
2) validation of the correct printing of the official receipt by the operator,
3) validation of the application by the operator.

The validation of the application is accessible only when the first 2 points are satisfied.

Printing the Official Receipt

After the generation of the official receipt, the operator must click on the printer button. The print button launches the printing of the official receipt. This button remains available until the application is validated; the operator can therefore make as many prints as is necessary.

Validating the Printing of the Official Receipt

After the printing of the official receipt, the operator must validate that the latter has been printed correctly.

The impossibility of printing the official receipt is a reason for abandoning the application.

The print validation buttons become accessible when at least one print has been requested.

The operator must respond with "Yes" or "No".

If the official receipt is correctly printed, the operator must respond "Yes". The button for validating the application then becomes accessible and the operator can pass to the validation of the application.

If the official receipt does not print (or prints poorly), the operator must firstly attempt to solve the printing problem. In the case where the printing of the official receipt is impossible, the operator must respond "No". The message hereinbelow is then displayed to the operator Description of the Process for Acquiring the Data from the Camera The sensor is configured to deliver a video stream sufficient, for example 1 Mpixel, to ensure fluidity in display on the screen of the PC through the USB link which links it to the PC. Automatic adaptation of the brightness is performed by real-time measurement on a predefined zone. This zone is parametrizable, through a "camera" configuration file for example as will be described hereinafter. It can cover a reduced area down to the whole of the image, as a function of the sensitivity level desired. For example, use is made of an automatic function of the camera with a brightness setpoint. On a gray background, this setpoint is equal to the gray level. This makes it possible, notably to ensure, homogeneity of the photos produced (gray background).

The acquisition phase starts with the pressing of an acquisition button activated by an operator. The sensor is toggled into so-called "total resolution" mode of 5 Mpixels, for example so as to allow the acquisition of an image with a maximum of resolution. The sensor is then reconfigured by modifying the exposure time to 150 ms, for example. A delay of about 500 ms is applied before launching the next phase, which corresponds to the sensor stabilization lag.

On completion of the toggling, an image is recorded in the memory of the PC. This original image will be used to perform the subsequent processing operations.

At the level of the display, the original image is for example displayed in the left part of the machine interface.

It is possible to implement various post-processing operations so as to improve the rendition and optimize the automatic quality control phase. These operations are for example performed by a software application designated "photo component" of the system according to the invention.

At the "post-processing" level, it is possible to adapt the image so as to optimize the quality control phase.

For example, a first post-processing consists in attenuating bright zones of the face. This processing acts, notably, on the values of contrast, saturation and gamma (brightness) of the recorded image.

Two levels of processing are applicable: low and average for example.

A second post-processing makes it possible to tailor the RGB components ( . . . ) of the image so as to obtain a gray background with no color dominant. It is possible to use two types of processing operations:

Simple balancing: This entails leveling the values of RGB component so as to make the gray uniform, by determining the average value of these components, measured over a fixed zone of the background of the image.

Balancing+Tailoring: this entails a simple balancing followed by a tailoring of the values of each pixel of the image as a function of the delta between the average value and a setpoint value, defined in the "Photo Component" configuration file.

At the level of the display, the processed image will be for example displayed in the left part of the screen of the PC.

The next step carried out by the operator will consist in identifying the position of the eyes in the image, by a piece of software known to the person skilled in the art. Next, the image will be reframed so as to center it on the face.

The next step will consist in a reduction in the initial size of the reframed image stored in memory (size between 600 Kbytes and 900 Kbytes) to a size of about 300 Kbytes once compressed. The image format used is for example of JPEG type. This operation can be performed in 2 steps; the first consists in determining the compression rate, for example by determining by dichotomy the best compression rate to be applied to obtain the appropriate compressed image size. Next during a second step, when the compression rate is determined, the compression is performed on the basis of the reframed image and then stored in the PC memory.

The processed image is for example displayed in the right part of the MMI. The image quality checking operation is performed by the operator. It consists, for example, in verifying that the compressed image meets the quality criteria required by the organization that establishes the identity document. Subsequent to the quality control check, the image is made available for the software application for enrolling the end user.

The present invention consists notably of a microcomputer associated with a station for acquiring a photo and prints, the lighting system. The data capture proposed in this offering makes it possible to guarantee the quality of the photo "at source" and thus to ensure that there will be no refusal in the production center. The software measuring the quality of the photo is the same in this offering as in the production center and this software will be used with the same settings. Moreover, the fact that the capture of the photo is performed "in real time" makes it possible to obtain a photo directly to the ICAO quality standards. There will therefore no longer be any toing and froing between the production center and the organizations entitled to establish identity documents.

The system and method according to the invention offers an optimization of fingerprint capture time and quality. It offers a biometric console integrating the multifinger print sensor, the feedback screen and the use of the scanner to carry out various functionalities required for establishing identity papers.

The invention claimed is:

1. A system configured to acquire biometric and biographical data of an individual, the system comprising:
 a station comprising a sensor configured to sense fingerprints of the individual, a camera configured to take a photograph of a face of said individual, and a feedback screen; and
 a gantry comprising lighting means configured to ensure lighting complying with predetermined conditions of acquisition of the, photograph of the face of said individual,
 wherein the lighting means comprise:
  a curved metallic reflector fixed to a rear and to an apex of the gantry,
  a first upper light tube placed substantially horizontally, the first upper light tube oriented opposite the face of said individual and toward said curved metallic reflector, and a second lower light tube placed substantially horizontally relatively lower than the first upper light tube and oriented toward the face of said individual, the curved metallic reflector being spaced behind said first upper light tube and said camera to reflect light from the first upper light tube onto the face of said individual, a luminous power of the second lower light tube being lower than a luminous power of the first upper light tube, the combined luminous power of the first upper light tube and the second lower light tube being such that the acquisition of the photograph of the face of the individual is in accordance with a required quality, and wherein the station is linked by a connection setup to a microcomputer.

2. The system of claim 1, wherein the required quality is in accordance with quality constraints relating to the ICAO 9303 or ISO 19794-5 standards.

3. The system of claim 1, wherein the system further comprises means for securely transmitting the biometric and biographical data, acquired in anonymous ways and decorrelated, between the microcomputer and a network.

4. The system of claim 1, wherein the microcomputer comprises a processor configured to execute at least:
   a module for acquiring the biographical data of the individual;
   a module for acquiring the biometric data of the individual;
   a module for receiving the photograph of the individual, for displaying the photograph of the individual on a feedback screen, for prompting the individual to frame his face by positioning himself with respect to the camera, for warning the individual that the acquisition of the photograph is in progress, for verifying the quality of the photograph of the individual, and for validating the photograph of the individual when the quality of the photograph is acceptable; and
   a module for receiving and checking the quality of the fingerprints, for checking a relationship between the fingerprints and a finger, for checking in real-time and continuously a quality of fingerprints received for each finger, and for selecting in real-time the best fingerprint received for a finger.

5. The system as claimed in claim 4, the feedback screen displays a color scale as a function of the quality of the fingerprints.

6. The system as claimed in claim 1, wherein the camera is integrated into the station, with externally sited capabilities for adjusting picture taking, accessible from outside of the station.

7. The system as claimed in claim 1, wherein the station comprises a horizontal part and a vertical part, and wherein:
   the sensor is integrated into the horizontal part of the station in proximity to the edge of the station,
   the camera is integrated into the vertical part of the station at average height of the eyes of the individual in a seated position,
   a feedback screen is integrated into the vertical part of the station facing the individual below the camera and above the sensor.

8. The use of the system of claim 1 to collect the biometric and biographical data in accordance with an identity card, a passport, or a driver's license.

9. The system as claimed in claim 1, wherein the required quality is the absence of shadowing or spots in the photograph of the face of the individual.

10. The system as claimed in claim 1, wherein the required quality is the natural look of colors in the photograph of the face of the individual.

11. The system as claimed in claim 2, wherein the required quality is in accordance with quality constraints relating to the ISO 19794-5 Part 5 standard.

12. The system as claimed in claim 1, wherein the curved metallic reflector is curved in a vertical direction.

13. The system as claimed in claim 1, wherein at least part of the curved metallic reflector extends below the first upper light tube.

14. The system as claimed in claim 1, wherein the lighting means further comprise a diffusion cowl located between the second lower light tube and said individual.

15. The system as claimed in claim 1, wherein the first upper light tube and the second lower light tube and located between the curved metallic reflector and said individual.

* * * * *